J. KELLY.
Corn-Planter.

No. 167,612.

Patented Sept. 14, 1875.

UNITED STATES PATENT OFFICE.

JOHN KELLY, OF TROY, OHIO.

IMPROVEMENT IN CORN-PLANTERS.

Specification forming part of Letters Patent No. 167,612, dated September 14, 1875; application filed March 19, 1875.

*To all whom it may concern:*

Be it known that I, JOHN KELLY, of Troy, in the county of Miami and State of Ohio, have invented certain Improvements in Corn-Planters, of which the following is a specification:

My invention relates to corn-planters; and consists in so constructing the machine that the driver may, by moving a lever and without leaving his seat, raise or depress the runners, according as the ground is soft or hard, and fix them in that position.

Figure 1:
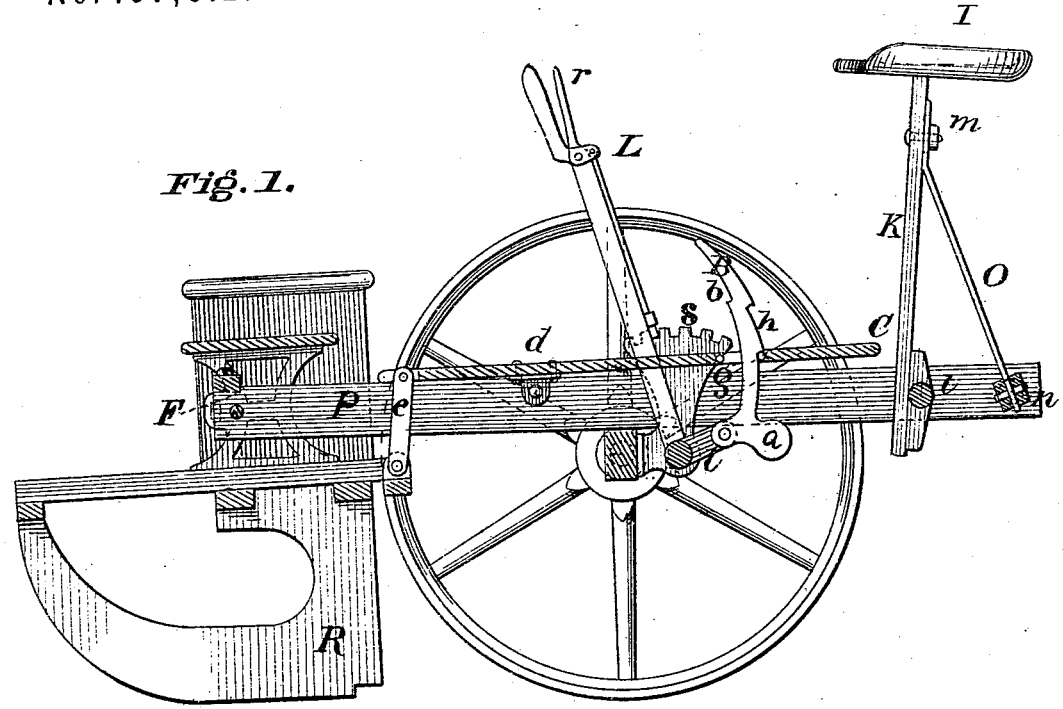
Figure 2:
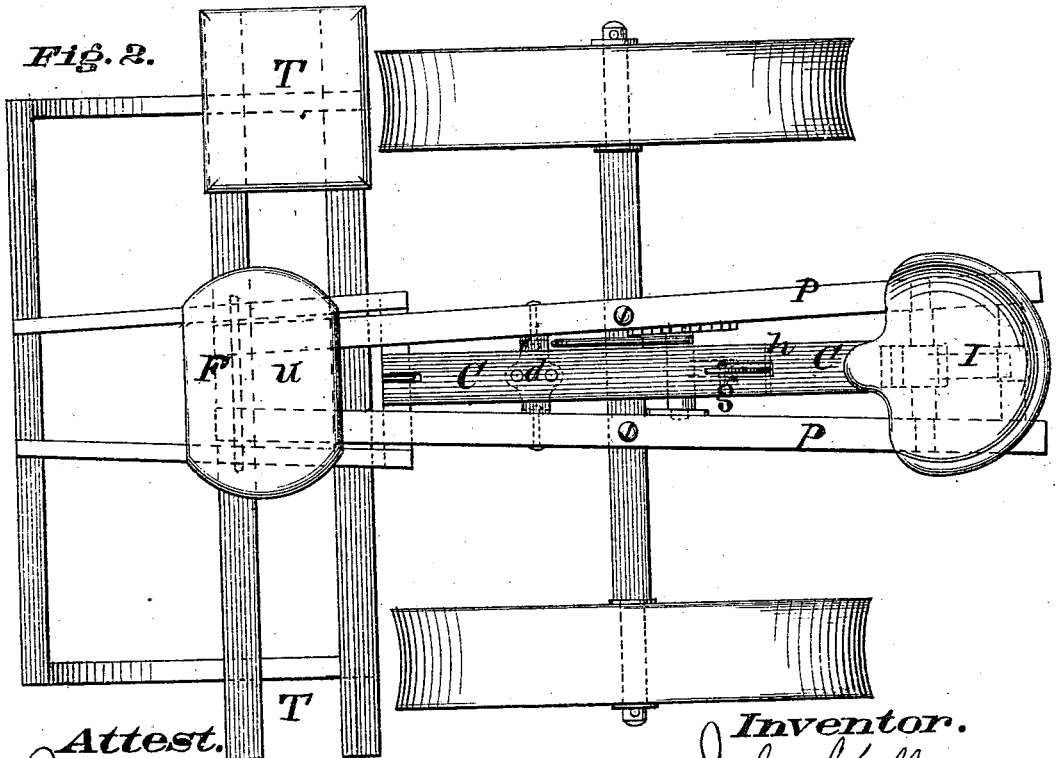

Figure 1 is a longitudinal section of a corn-planter, with my improvements, and Fig. 2 is a top view of the same.

In the drawings, R represents the runners, which are pivoted in the ordinary manner at F to the beams P, which are attached to the axle of the driving-wheels. The tongue of the machine, which is not shown in the drawings, is attached to the runners in the ordinary manner. At $d$ is pivoted to the beams P a beam, $c$. This beam is attached at its forward end to the runners by a link, $e$, as shown in Fig. 1. L is a lever, whose fulcrum is at its lower end, which has a short, horizontal arm, $l$, to which is hinged a hook, B. This hook passes through a slot in the beam $c$, and has a weight, $a$, to keep it against the back end of the slot. The slot has two pins, $g$ and $h$, one at each end, on which catch notches in the hook. At S is a toothed sector, into which works a catch actuated by the handle $r$, so that when the operator grasps the handle of the lever L in his hand the handle $r$ is pressed close to it and raises the catch so that the lever may be moved backward and forward. This catch and sector serve to keep the lever in any desired position. I is the driver's seat, fixed to a support, K, which is pivoted at $l$ to the frame P of the machine. O is a brace pivoted at $n$. At $m$ is a bolt, passing through the support K, and through a slot in the brace O.

To balance the machine, the nut $m$ is loosened, and the seat I moved backward or forward, which the slot in the brace O allows it to do, until the proper balance is obtained. The nut is then tightened and the seat will be held firmly in place.

If it be desired to box the machine for transportation or other purposes, the bolt $m$ is withdrawn, and the seat and brace may then be folded down flat.

In passing over soft ground the wheels sink in to a certain extent, which lowers the runners, and it is often desirable to raise them somewhat. This is done by the driver's drawing the lever-handle L back. This pulls the hook B down, and with it the rear end of the beam $c$, and as that beam is pivoted at $d$, its forward end, and with it the runners R are raised.

In passing over hard ground it is desirable for analogous reasons to lower the runners. This is done by moving the lever L forward, when the runners will be lowered by their own weight.

In the case of very hard ground it is sometimes necessary to force the runners down. To do this the driver, with his foot, pushes the hook B forward, so as to detach the notch from the pin $h$. He then draws the lever back until the notch $b$ catches on the pin $g$, and then pushes it forward, thus forcing the runners down into the ground.

It will be seen that the driver has thus a ready means of raising or lowering the runners, or of forcing them down instantaneously and without stopping the machine, and of holding them in any required position without the exercise of muscular power, which is a very valuable assistance, especially where the ground varies from hard to soft, and vice versa, in the same field.

The hook B has two notches to catch on the pin $h$. The lower one of these is to raise the runners off the ground in driving to and from the field, and the other for use in the field.

The seed-boxes and feeding-mechanism are placed at T T, but are not shown, as they form no part of this invention.

What I claim as my invention is—

1. The combination, in a corn-planter, of hand-lever L, hook B, and beam $c$, for raising or lowering the runners, or forcibly depressing the same, at the will of the operator, substantially as described.

2. The combination, in a corn-planter, of hook B and counter-balance $a$, substantially as and for the purpose set forth.

3. The combination, in a corn-planter, of the hook B, hand-lever L, and toothed sector and catch, substantially as and for the purposes specified.

4. In a corn-planter, the combination of beam c, pivoted at d to the frame of the machine, hook B, acting in a slot in the beam c, as described, and lever L, to actuate the same, for the purpose set forth.

JOHN KELLY.

Attest:
W. F. Ross,
R. Gibbs.